(12) United States Patent
Mian et al.

(10) Patent No.: US 9,571,796 B2
(45) Date of Patent: Feb. 14, 2017

(54) NONCONTACT MEASURING DEVICE

(71) Applicant: International Electronic Machines Corporation, Troy, NY (US)

(72) Inventors: Zahid F. Mian, Loudonville, NY (US); Ryk E. Spoor, Troy, NY (US); Ronald W. Gamache, East Greenbush, NY (US)

(73) Assignee: International Electronic Machines Corp., Troy, NY (US)

( * ) Notice: Subject to any disclaimer, the term of this patent is extended or adjusted under 35 U.S.C. 154(b) by 121 days.

(21) Appl. No.: 14/219,173

(22) Filed: Mar. 19, 2014

(65) Prior Publication Data
US 2014/0285658 A1 Sep. 25, 2014

Related U.S. Application Data

(60) Provisional application No. 61/852,768, filed on Mar. 21, 2013.

(51) Int. Cl.
| | |
|---|---|
| *H04N 7/18* | (2006.01) |
| *G01B 5/08* | (2006.01) |
| *G01B 11/25* | (2006.01) |

(52) U.S. Cl.
CPC ............. *H04N 7/18* (2013.01); *G01B 11/25* (2013.01); *G01B 11/2545* (2013.01)

(58) Field of Classification Search
CPC ........ H04N 7/18; G01B 11/25; G01B 11/2545
USPC ......................................................... 348/136
See application file for complete search history.

(56) References Cited

U.S. PATENT DOCUMENTS

| | | | |
|---|---|---|---|
| 4,904,939 A | 2/1990 | Mian | |
| 5,506,683 A | 4/1996 | Yang et al. | |
| 5,636,026 A | 6/1997 | Mian et al. | |
| 5,808,906 A | 9/1998 | Sanchez-Revuelta et al. | |
| 5,978,077 A | 11/1999 | Koerner et al. | |
| 6,542,249 B1 | 4/2003 | Kofman et al. | |
| 6,768,551 B2 | 7/2004 | Mian et al. | |
| 7,478,570 B2 | 1/2009 | Mian et al. | |
| 2005/0068522 A1 | 3/2005 | Dorrance et al. | |

(Continued)

FOREIGN PATENT DOCUMENTS

| | | |
|---|---|---|
| DE | 20 2012 104890 U1 | 3/2013 |
| EP | 2527784 A1 | 11/2012 |

OTHER PUBLICATIONS

Ahn, International Search Report and Written Report, PCT/US2014/031165, Jul. 28, 2014, 16 pages.

(Continued)

*Primary Examiner* — Jamie Atala
*Assistant Examiner* — Nguyen Truong
(74) *Attorney, Agent, or Firm* — LaBatt, LLC

(57) ABSTRACT

A solution including a noncontact electronic measurement device is provided. The measurement device includes one or more imaging devices configured to acquire image data of a surface of an object located in a measurement region relative to the measurement device and one or more projected pattern generators configured to generate divergent pattern(s) of structured light, which impact the surface of the object within a field of view of the imaging device when the object is located in the measurement region. Using image data acquired by the imaging device(s), a computer system can measure a set of attributes of the surface of the object and/or automatically determine whether the measurement device is within the measurement region. An embodiment is configured to be held by a human user during operation.

20 Claims, 9 Drawing Sheets

(56) References Cited

U.S. PATENT DOCUMENTS

2007/0075192 A1   4/2007  Mian et al.
2008/0130015 A1   6/2008  Lu

OTHER PUBLICATIONS

Riftex Sensors & Instruments, "Laser Wheel Profilometer IKP-5, IKP-5R Series", Sep. 24, 2012, 63 pages.
Calipri, "The Power of 3", 9 pages.
Riftex Sensors & Instruments, "Portable Laser Rail Profilometer PRP Series", Mar. 30, 2012, 46 pages.
Riftex Sensors & Instruments, "Wheel Diameter Measuring Gauge IDK Series", Jul. 16, 2012, 14 pages.
Lai, L., Application No. 2014235971, Examination Report1, May 19, 2016, 3 pages.
Basic, G., U.S. Pat. No. 2,902,742, , Office Action, Aug. 11, 2016, 4 pages.
Petelski, T., Application No. EP 14768093, Supplementary European Search Report, Oct. 10, 2016, 7 pages.

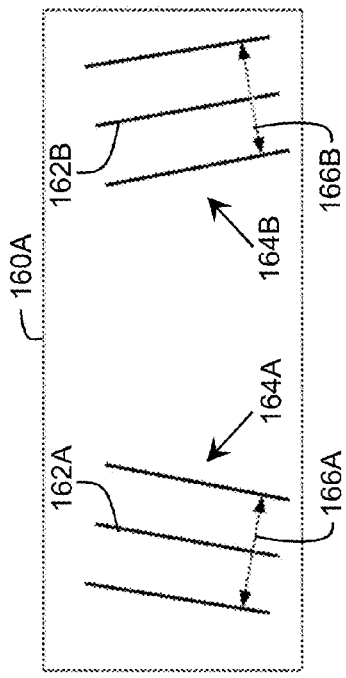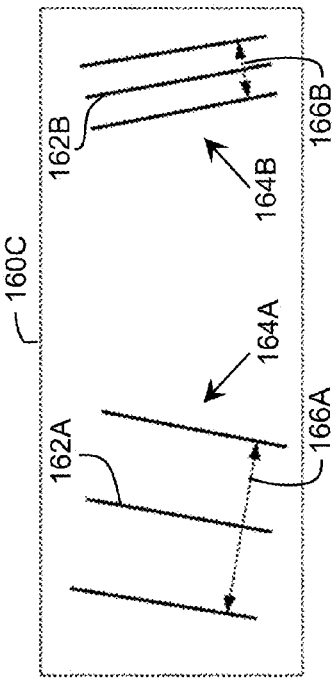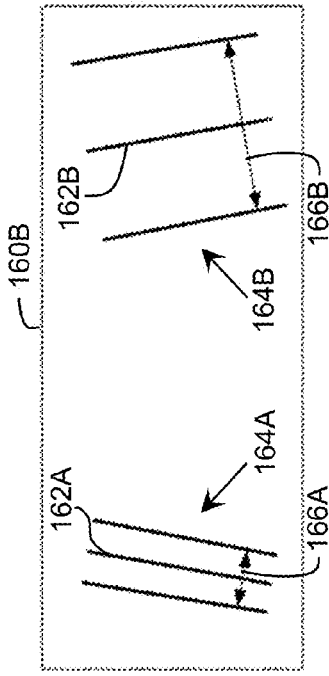

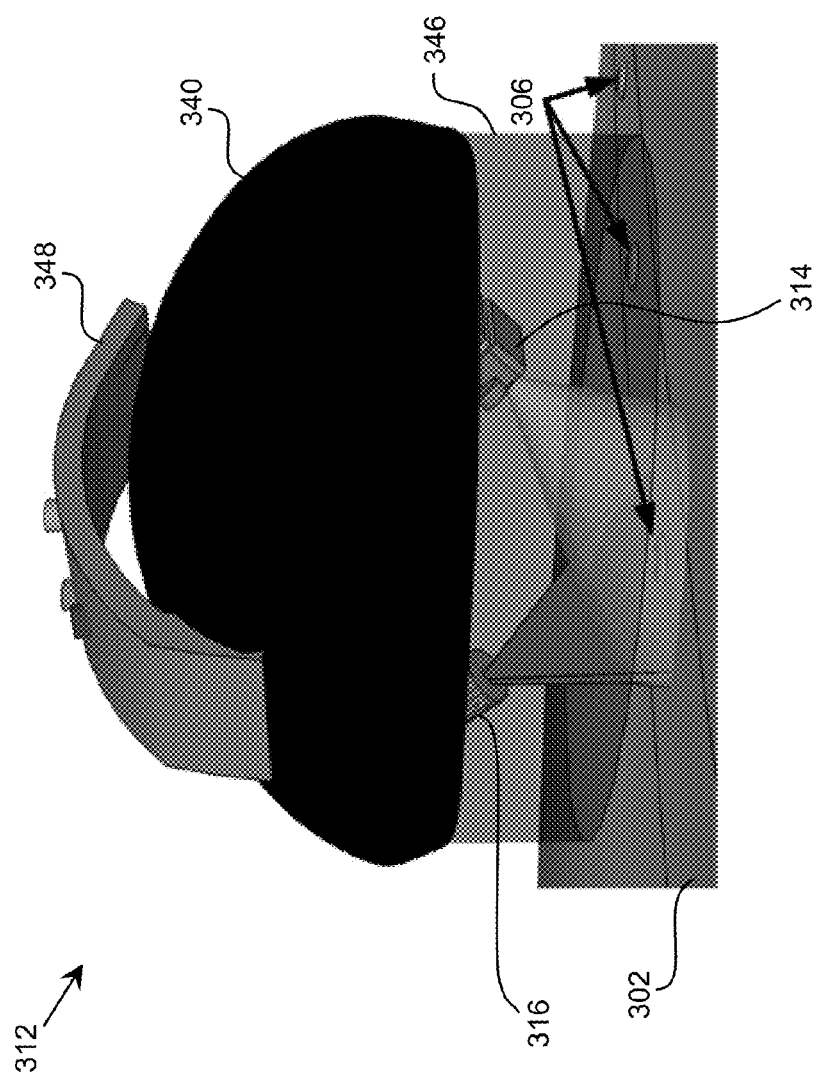

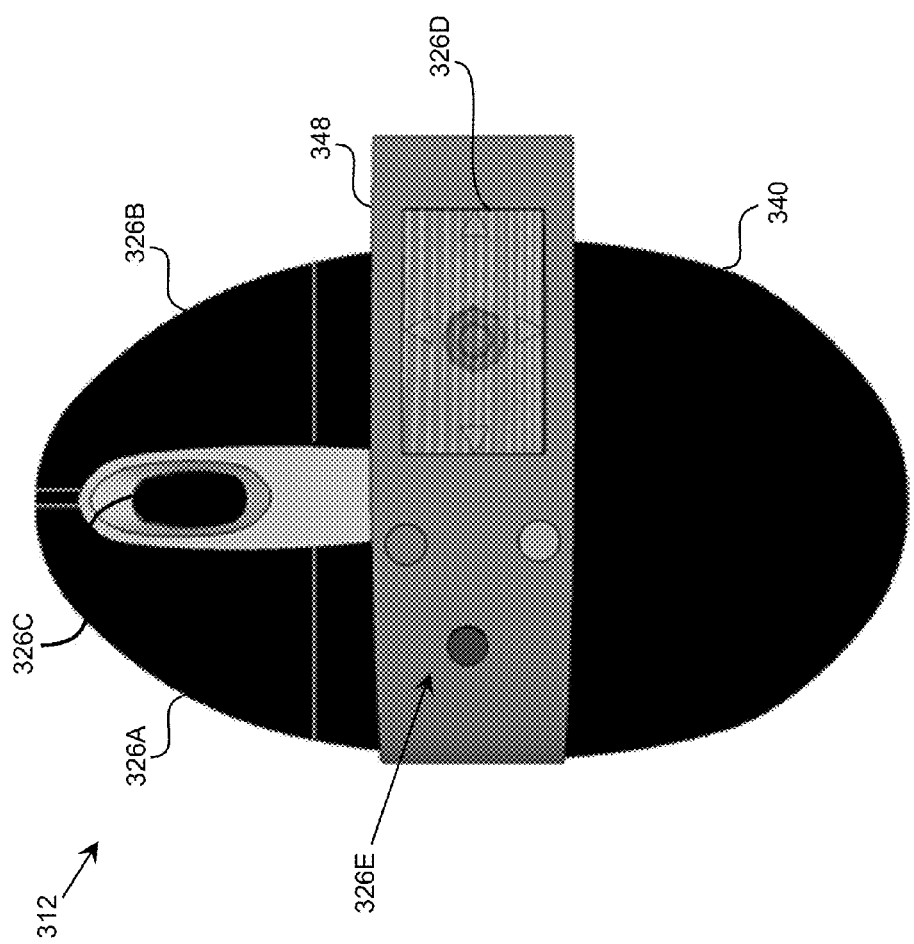

NONCONTACT MEASURING DEVICE

REFERENCE TO RELATED APPLICATIONS

The current application claims the benefit of co-pending U.S. Provisional Application No. 61/852,768, titled "Noncontact Electronic Wheel Gauge," which was filed on 21 Mar. 2013, and which is hereby incorporated by reference.

GOVERNMENT LICENSE RIGHTS

This invention was made with partial government support under contract no. TRANSIT-72 awarded by the National Academy of Sciences. The government has certain rights in the invention.

TECHNICAL FIELD

The disclosure relates generally to measuring aspects of railroad wheels, and more particularly, to a noncontact electronic wheel gauge.

BACKGROUND ART

Current systems for measuring aspects of railroad wheels include numerous types of physical gauges, such as a "J" type steel wheel gauge approved by the Association of American Railroads (AAR) and a "pi tape" for measuring a circumference/diameter of railroad wheels. Such devices are inexpensive and simple, however, use of the device is prone to human error based on precise placement and angle of view of the devices. Furthermore, an overall accuracy is limited by human perceptual capabilities. Electronic wheel gauges also are used, including those described in U.S. Pat. Nos. 4,904,939 and 7,478,570 and a wheel diameter gauge provided by Riftek. These devices provide more accurate measurements, but are somewhat bulky and are often difficult to fit into restricted spaces afforded by transit railcar wheels.

Some devices seek to provide minimal contact or noncontact measurement. For example, a laser wheel profilometer offered by Riftek projects a single point of light from a moving carriage across a wheel, deriving a wheel profile from multiple point distance readings. The device includes moving components, which are subject to wear and breakage and often cannot fit in small areas. Structured-light based measurement of railroad wheels has been implemented in wayside and in-ground systems, such as those described in U.S. Pat. Nos. 5,636,026 and 6,768,551, both of which are hereby incorporated by reference. These measurement systems have been shown to be highly effective and reliable at measuring railroad wheels from structured light projections, but are extremely expensive, permanent installations.

Another gauge, Calipri, offered by NextSense, measures the main profile aspects of a wheel using a noncontact solution by having an operator carefully pass a sensor head around the wheel in a semicircular fashion. However, this gauge cannot measure diameter without the use of a large, separate fixture and a separate measurement. Furthermore, the gauge requires the operator to move the sensor head in a precise manner, requires a significant standoff distance, and requires a separate connected computational and display component. The gauge takes measurements from a succession of images acquired over a period of time, which must be referenced to each other with an extremely high degree of precision if the resulting measurements are to be in any way accurate. As a result, the gauge also requires use of an expensive and sophisticated inertial measurement unit (IMU) to recognize and compensate for significant variations of poses of the operator's hand while taking the measurements.

SUMMARY OF THE INVENTION

Aspects of the invention provide a solution including a noncontact electronic measurement device. The measurement device includes one or more imaging devices configured to acquire image data of a surface of an object located in a measurement region relative to the measurement device and one or more projected pattern generators configured to generate divergent pattern(s) of structured light, which impact the surface of the object within a field of view of the imaging device when the object is located in the measurement region. Using image data acquired by the imaging device(s), a computer system can measure a set of attributes of the surface of the object and/or automatically determine whether the measurement device is within the measurement region. An embodiment is configured to be held by a human user during operation.

A first aspect of the invention provides a system comprising: a handheld measurement device including: a first imaging device configured to acquire image data of a surface of an object located in a measurement region relative to the handheld measurement device; a projected pattern generator configured to generate a divergent pattern of structured light, wherein the divergent pattern of structured light impacts the surface of the object within a field of view of the first imaging device when the object is located in the measurement region; and a computer system configured to measure a set of attributes of the surface of the object by performing a measurement method including: activating the first imaging device; processing the image data acquired by the first imaging device in response to the activating; and determining a measurement of at least one attribute of the surface of the object based on the processing.

A second aspect of the invention provides a system comprising: a handheld railroad wheel measurement device including: first and second imaging devices configured to acquire image data of a portion of a railroad wheel located in a measurement region relative to the handheld railroad wheel measurement device, wherein the image data acquired by the first imaging device has a field of view at least partially overlapping the image data acquired by the second imaging device when the railroad wheel is located in the measurement region; a projected pattern generator configured to generate a divergent pattern of structured light, wherein the divergent pattern of structured light impacts a surface of the railroad wheel within the fields of view of the first and second imaging devices when the railroad wheel is located in the measurement region; and a computer system configured to concurrently activate the first and second imaging devices and process the image data acquired by the first and second imaging devices.

A third aspect of the invention provides a system comprising: a measurement device including: a first imaging device configured to acquire image data of a surface of an object located in a measurement region relative to the handheld measurement device; a projected pattern generator configured to generate a divergent pattern of structured light, wherein the divergent pattern of structured light impacts the surface of the object within a field of view of the imaging device when the object is located in the measurement region; an accelerometer; and a computer system configured to acquire data for measuring a set of attributes of the surface of the object by performing an acquisition method including: activating the first imaging device and the projected pattern generator; determining a pose of the measurement device using image data acquired by the first imaging device and data received from the accelerometer; and evaluating at least one of: the image data and the pose to determine whether the measurement device is within a measurement region.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIGS. 6A-6C show illustrative pairs of diameter patterns according to an embodiment.

FIGS. 8A and 8B show side and top views, respectively, of an illustrative measurement device for measuring attributes of a substantially uniform surface according to an embodiment.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution including a noncontact electronic measurement device. The measurement device includes one or more imaging devices configured to acquire image data of a surface of an object located in a measurement region relative to the measurement device and one or more projected pattern generators configured to generate divergent pattern(s) of structured light, which impact the surface of the object within a field of view of the imaging device when the object is located in the measurement region. Using image data acquired by the imaging device(s), a computer system can measure a set of attributes of the surface of the object and/or automatically determine whether the measurement device is within the measurement region. An embodiment of the measurement device is configured to be held by a human user during operation. As used herein, unless otherwise noted, the term "set" means one or more (i.e., at least one) and the phrase "any solution" means any now known or later developed solution.

Figure 1:
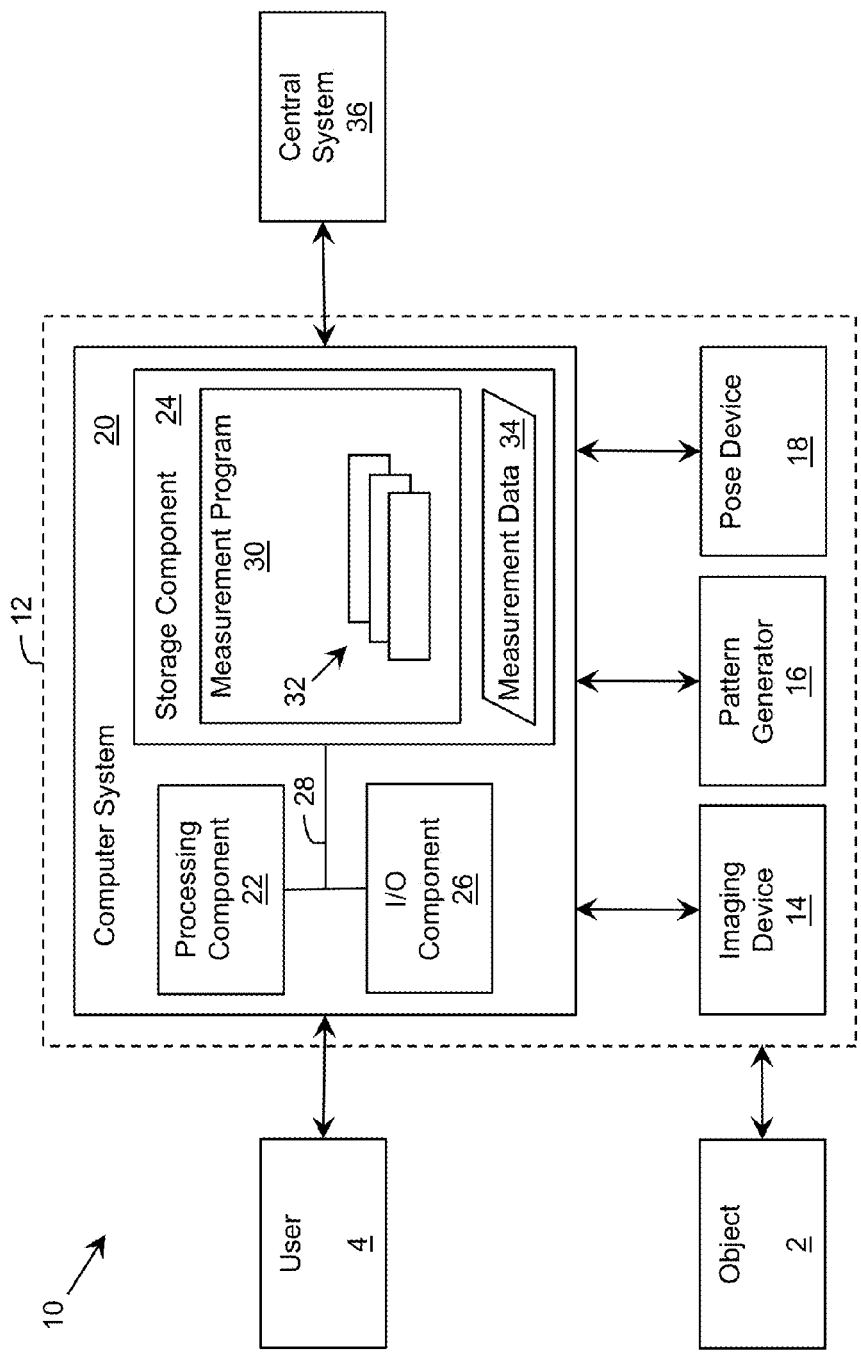
FIG. 1 shows an illustrative environment for measuring one or more attributes of a surface of an object according to an embodiment.

Turning to the drawings, FIG. 1 shows an illustrative environment 10 for measuring one or more attributes of a surface of an object 2 according to an embodiment. To this extent, the environment 10 includes a measurement device 12, which a user 4 can hold to measure attribute(s) of a surface of the object 2 using a noncontact electronic measurement solution described herein. The measurement device 12 includes a computer system 20 that can perform a process described herein in order to acquire data used to measure a set of target attributes of the surface of the object 2. In particular, the computer system 20 is shown including a measurement program 30, which makes the computer system 20 operable to acquire measurement data 34 used to measure the set of target attributes of the surface of the object 2 by performing a process described herein.

The computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, the processing component 22 executes program code, such as the measurement program 30, which is at least partially fixed in storage component 24. While executing program code, the processing component 22 can process data, which can result in reading and/or writing transformed data from/to the storage component 24 and/or the I/O component 26 for further processing. The pathway 28 provides a communications link between each of the components in the computer system 20. The I/O component 26 can comprise one or more human I/O devices, which enable a human user 4 to interact with the computer system 20 and/or one or more communications devices to enable a system user, such as central system 36, to communicate with the computer system 20 using any type of communications link. To this extent, the measurement program 30 can manage a set of interfaces (e.g., graphical user interface(s), application program interface, and/or the like) that enable human (e.g., user 4) and/or system (e.g., central system 36) users to interact with the measurement program 30. Furthermore, the measurement program 30 can manage (e.g., store, retrieve, create, manipulate, organize, present, etc.) the data, such as measurement data 34, using any solution.

In any event, the computer system 20 can comprise one or more general purpose computing articles of manufacture (e.g., computing devices) capable of executing program code, such as the measurement program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the measurement program 30 can be embodied as any combination of system software and/or application software.

Furthermore, the measurement program 30 can be implemented using a set of modules 32. In this case, a module 32 can enable the computer system 20 to perform a set of tasks used by the measurement program 30, and can be separately developed and/or implemented apart from other portions of the measurement program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Furthermore, it is understood that some of the functionality discussed herein may not be implemented, may be implemented apart from the computer system 20 (e.g., by the central system 36), and/or additional functionality may be included as part of the computer system 20.

When the computer system 20 comprises multiple computing devices, each computing device can have only a portion of the measurement program 30 fixed thereon (e.g., one or more modules 32). However, it is understood that the computer system 20 and the measurement program 30 are only representative of various possible equivalent computer systems that may perform a process described herein. To this extent, in other embodiments, the functionality provided by the computer system 20 and the measurement program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 20 includes multiple computing devices, the computing devices can communicate over any type of communications link. Furthermore, while performing a process described herein, the computer system 20 can communicate with one or more other computer systems, such as the central system 36, using any type of communications link. In either case, the communications link can comprise any combination of various types of optical fiber, wired, and/or wireless links; comprise any combination of one or more types of networks; and/or utilize any combination of various types of transmission techniques and protocols.

In an illustrative embodiment described herein, a user 4 can hold and operate the measurement device 12 to acquire measurement data 34 used for measuring one or more attributes of a surface of an object 2 using a noncontact solution. In an embodiment, the measurement data 34 includes image data of the surface of the object 2 captured by the measurement device 12. To this extent, the measurement device 12 can include one or more imaging devices 14 located thereon. An imaging device 14 can comprise any type of imaging device having a desired size, resolution, and frame rate. In an illustrative embodiment, an imaging device 14 comprises a miniature camera having a 4.3 mm focal length lens, and being capable of acquiring image data at up to two hundred frames per second at a resolution of at least 320×240. Furthermore, the measurement device 12 can include a pattern generator 16 and a pose device 18, one or both of which can be included to assist in processing the image data to determine the set of attributes of the surface of the object 2 as described herein. An illustrative pattern generator 16 can be configured to generate a set of laser lines (e.g., a 3-line projector) having an applicable fan angle for a target working distance.

While not shown for clarity, it is understood that the measurement device 12 can include various other components. For example, to enable ready operation of the measurement device 12, the measurement device 12 can include a power source (e.g., one or more batteries) capable of providing sufficient power to the various devices located thereon without access to an external power source. Alternatively, the measurement device 12 can be configured to operate using an external power source, such as power from an electrical grid. As described herein, an embodiment of the measurement device 12 can be configured for handheld use. To this extent, the measurement device 12 can have an overall size and weight to facilitate ready use of the measurement device 12. In an illustrative embodiment, the measurement device 12 can have a longest dimension of one foot or less, and weigh less than approximately five pounds.

Figure 2:
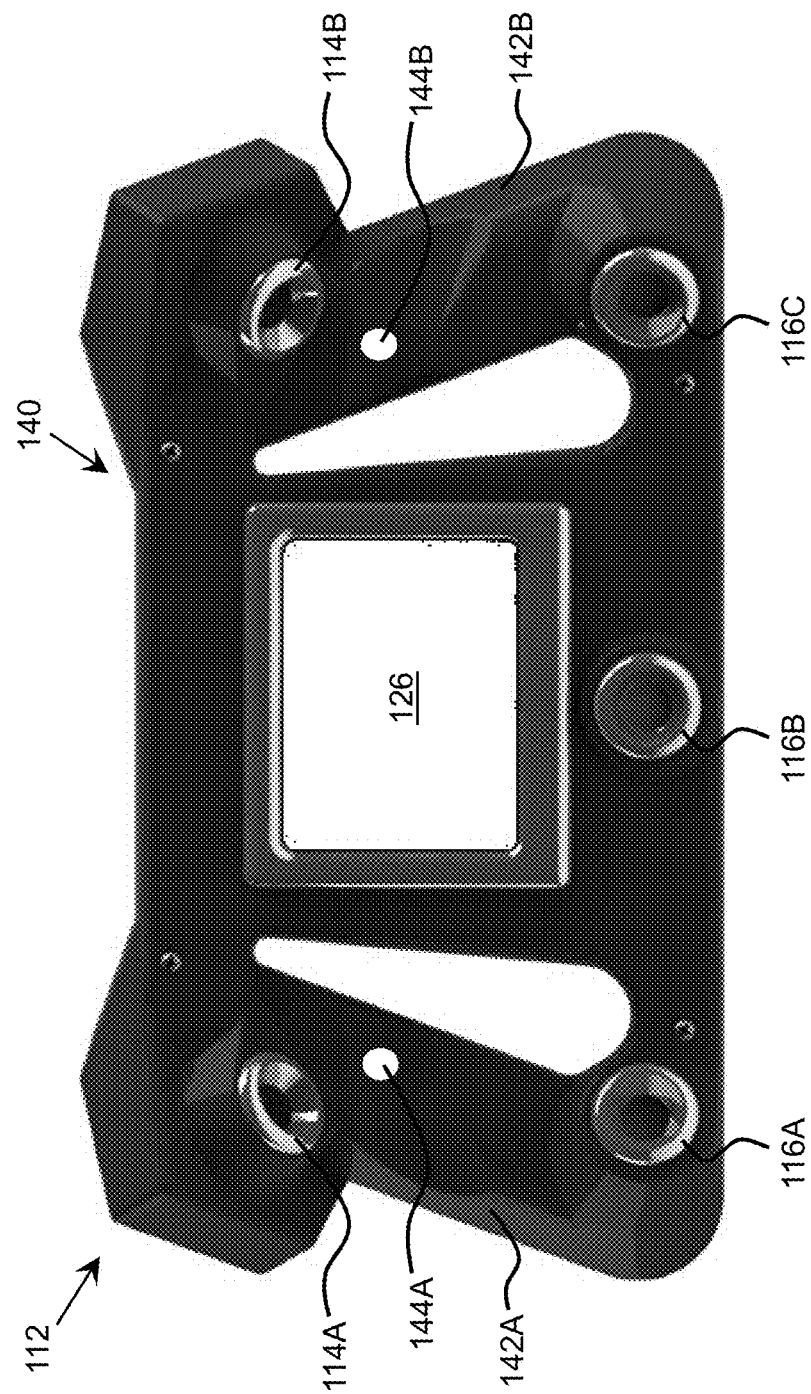
FIG. 2 shows a more particular illustrative measurement device for use in acquiring object measurement data according to an embodiment.

FIG. 2 shows a more particular illustrative measurement device 112 for use in acquiring object measurement data according to an embodiment. As illustrated, the measurement device 112 includes: two imaging devices 114A, 114B; three pattern generators 116A-116C; and an interface component 126 for enabling a user 4 (FIG. 1) to interact with a computer system 20 (FIG. 1) located in an enclosure (e.g., a case) 140 of the device 112. The enclosure 140 also includes a pair of handles 142A, 142B, either or both of which can be grasped by the user 4 during operation of the measurement device 112. While the interface component 126 is shown as a touch screen, it is understood that the interface component 126 can include any combination of various types of input and/or output devices including, for example, one or more triggers/buttons, a speaker, a microphone, and/or the like.

The imaging devices 114A, 114B can have significantly overlapping fields of view. In an embodiment, the imaging devices 114A, 114B are located with a precise alignment based on a dimension of a target image area of the surface of the object 2 (FIG. 1) and a target distance for the measurement device 112 to be held from the object 2 using any solution. In this case, the imaging devices 114A, 114B can be aligned to have substantially overlapping fields of view corresponding to the target image area when the measurement device 112 is held at the target distance from the object 2. However, it is understood that the imaging devices 114A, 114B can have a range of measurement locations within which image data acceptable for measuring the target set of attributes of the surface of the object 2 can be acquired. Such a range of measurement locations will be determined based on various factors including: the alignment of the imaging devices 114A, 114B; attributes of the surface being imaged; resolution of the imaging devices 114A, 114B; desired accuracy of the measurements; a reasonable range of distances within which a user 4 can locate the measurement device 112; and/or the like. Additionally, a range of measurement locations can include variations from an optimal distance from the surface of the object 2, variations from an optimal orientation of the measurement device 112 with respect to the surface of the object 2, and/or the like.

Each pattern generator 116A-116C can be configured to generate a pattern of light that impacts the surface of the object 2 in a location within the fields of view of one or both of the imaging devices 114A, 114B when the measurement device 112 is held within the range of measurement locations. The particular pattern(s) generated by the pattern generators 116A-116C can be selected based on one or more attributes of the surface being imaged and/or the set of attributes for which measurement is desired. In an embodiment, a pattern generated by a pattern generator 116A-116C and subsequently imaged by one or both imaging devices 114A, 114B can provide information in the image data, which can be utilized by the computer system 20 to determine a distance between the object 2 and the measurement device 112, a relative pose of the measurement device 112 with respect to the surface of the object 2, whether the measurement device 112 was located within a range of measurement locations, and/or the like.

In an illustrative embodiment, the object 2 is a railroad wheel. In this case, the railroad wheel can be installed on a rail vehicle or located apart from a rail vehicle (e.g., alone, as part of a pair of rail wheels on an axle, as part of a rail wheel truck, and/or the like). The rail vehicle can comprise a freight vehicle, a locomotive, a transit rail vehicle, and/or the like. Regardless, the measurement device 112 can be utilized to acquire measurement data 34 (FIG. 1), which can be used to calculate measurements of any combination of various attributes of the rail wheel including, for example, one or more of: the wheel flange, the wheel tread, the wheel rim, and/or the like. When properly installed on an axle, the wheel flange of the rail wheel is located on the gauge side, or inside, of the tracks, while the wheel rim faces the field side, or outside, of the tracks. In an embodiment, the measurement device 112 is configured to have a target distance from the rail wheel between approximately five to seven inches (e.g., twelve to eighteen centimeters).

Figure 3:
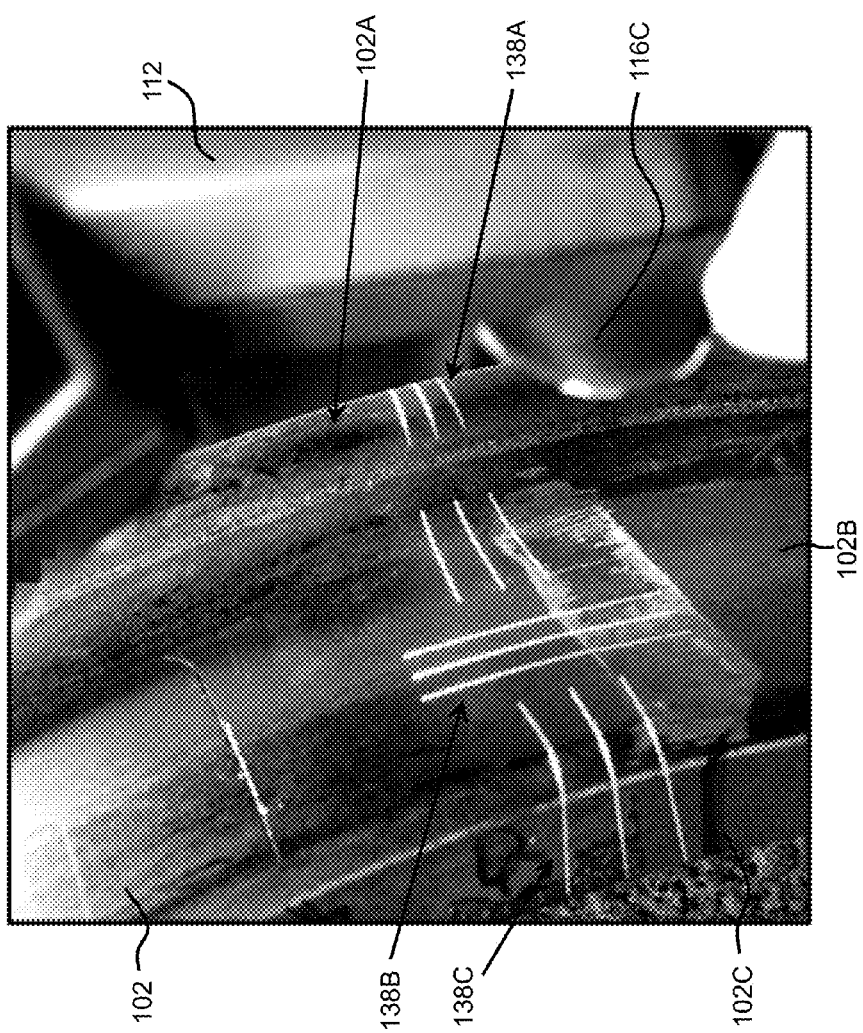
FIG. 3 illustrates the measurement device of FIG. 2 being used to acquire measurement data corresponding to a surface of a rail wheel according to an embodiment.

FIG. 3 illustrates the measurement device 112 being used to acquire measurement data 34 (FIG. 1) corresponding to a surface of a rail wheel 102 according to an embodiment. In this case, the measurement device 112 is being operated such that the imaging devices 114A, 114B (FIG. 2) are located above the pattern generators 116A-116C (only the pattern generator 116C is visible in FIG. 3). However, it is understood that this is only illustrative, and the measurement device 112 can be configured to operate when oriented with the imaging devices 114A, 114B located below the pattern generators 116A-116C. In an embodiment, the computer system 20 (FIG. 2) can be configured to allow the measurement device 112 to be operated using either orientation and automatically determine the orientation for providing the user 4 with information regarding locating the measurement device 112 within the range of measurement locations as described herein.

In FIG. 3, the measurement device 112 is oriented such that the imaging device 114A provides a gauge side view of the rail wheel 102, while the imaging device 114B provides a field side view of the rail wheel 102. When evaluating rail wheels located on a rail vehicle, or the like, the imaging device 114A, 114B corresponding to the field side or gauge side of the rail wheel 102 will vary based on the side of the rail vehicle on which the rail wheel 102 is located. To this extent, the computer system 20 can automatically determine to which side of the rail wheel 102 each of the imaging devices 114A, 114B corresponds using a solution described herein.

As illustrated, the rail wheel 102 includes a wheel flange 102A, a wheel tread 102B, and a wheel rim 102C. Referring to FIGS. 2 and 3, during operation of the measurement device 112, the pattern generators 116A-116C generate patterns of laser lines 138A-138C, respectively, which are projected onto the surface of the rail wheel 102 within the fields of view of the imaging devices 114A, 114B. As illustrated, each of the outer pattern generators 116A, 116C can project horizontal line patterns 138A, 138C, respectively, while the central pattern generator 116B can project a vertical line pattern 138B. When the measurement device 112 is located in a measurement region, the vertical line pattern 138B can be projected onto the tread 102B of the rail wheel 102, one of the outer horizontal line patterns 138C can be projected onto a portion of the tread 102B and the wheel rim 102C, and the other of the outer horizontal line patterns 138A can be projected onto a portion of the tread 102B and a portion of the flange 102A (including the interior side of the flange 102A, not shown in FIG. 3).

The computer system 20 (FIG. 1) can operate the pattern generators 116A-116C to generate the patterns 138A-138C in response to an input received from the user 4 (FIG. 1). Additionally, the computer system 20 can concurrently activate the imaging devices 114A, 114B to acquire image data, e.g., a series of images, substantially simultaneously. When the measurement device 112 is located in a measurement region with respect to the rail wheel 102, the patterns 138A-138C and the fields of view of the imaging devices 114A, 114B can be configured to cover an entire profile of the rail wheel 102 from one rim face to the other.

Figure 4B:
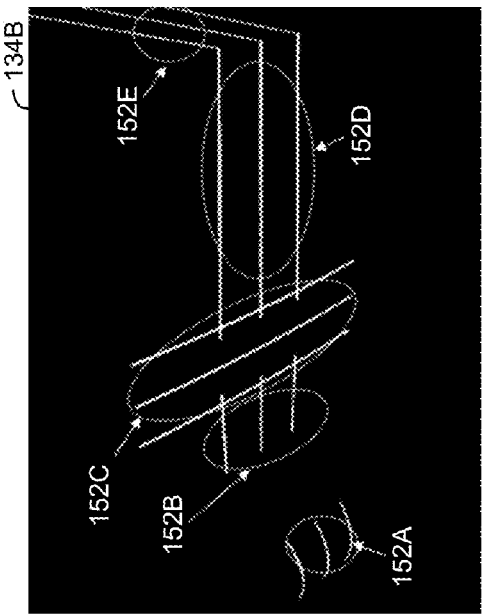
FIGS. 4A and 4B show illustrative images of a rail wheel acquired by the measurement device of FIG. 2 according to an embodiment.
Figure 4A:
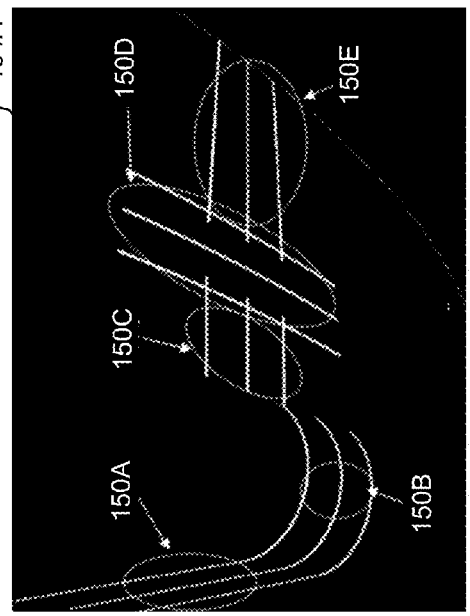

FIGS. 4A and 4B show illustrative images 134A, 134B of a rail wheel 102 (FIG. 3) acquired by the measurement device 112 (FIG. 2) according to an embodiment. Referring to FIGS. 2 through 4A and 4B, image 134A can be acquired by imaging device 114A, while image 134B can be substantially simultaneously acquired by imaging device 114B. As illustrated, the imaging devices 114A, 114B can be separated by a sufficient distance to enable their combined fields of view to concurrently acquire image data 134A, 134B of the rail wheel 102 from one rim face to the other. To this extent, image data 134A can provide a gauge side view of the rail wheel 102, while image data 134B can provide a field side view of the rail wheel 102.

In the image data 134A, 134B, various light patterns are visible, which can provide information used by the computer system 20 (FIG. 1) to make various measurements of the surface of the rail wheel 102. For example, in the gauge side image data 134A, the light patterns include: a gauge side rim pattern 150A, a gauge side flange pattern 150B, a gauge side inboard tread pattern 150C, a gauge side wheel diameter pattern 150D, and a gauge side outboard tread pattern 150E. In the field side image data 134B, the light patterns include: a field side flange pattern 152A, a field side inboard tread pattern 152B, a field side wheel diameter pattern 152C, a field side outboard tread pattern 152D, and a field side rim pattern 152E. It is understood that, with the exception of the gauge side rim pattern 150A and the field side rim pattern 152E, the remaining patterns correspond to the same patterns generated by the pattern generators 116A-116C, just imaged from opposite sides of the rail wheel 102.

Using this duplication of patterns within image data 134A, 134B concurrently acquired by imaging devices 114A, 114B having a known relationship with one another, the computer system 20 can construct a very accurate three-dimensional representation of the patterns 150A-150E, 152A-152E. The computer system 20 can use the three-dimensional representation to determine measurement(s) of one or more attributes of the surface of the rail wheel 102 using any solution. In an embodiment, the computer system 20 utilizes a solution described in U.S. Pat. Nos. 5,626,026 and 6,768,551, both of which are incorporated by reference, to extract an accurate profile of the rail wheel 102 and determine measurement(s) of one or more attributes of the surface of the rail wheel 102. Using similar techniques and curve-fitting approaches, the computer system 20 can use the diameter patterns 150D, 152C, which can be configured to provide a significant portion of a curve of the wheel tread 102B, to derive an accurate estimate of a diameter of the rail wheel 102.

As illustrated, each of the patterns 150A-150E, 152A-152E can include multiple (e.g., three) lines of light. In this case, the computer system 20 can construct multiple profiles of the rail wheel 102 and compare the profiles to determine whether any obvious anomalies are present. Furthermore, the computer system 20 can independently derive a measurement of an attribute of the rail wheel 102 multiple times. Using multiple measurements of an attribute, the computer system 20 can ignore a measurement that is significantly different from the other measurements. For example, a flange measurement may differ significantly from the other flange measurements, in which case the computer system 20 can ignore the one measurement. Regardless, when multiple measurements of an attribute appear valid, the computer system 20 can average the measurements to determine a final measurement for the attribute, which will generally result in a more accurate and reliable final measurement of the attribute of the rail wheel 102.

In an embodiment, the pattern generators 116A-116C generate divergent patterns of structured light. In this case, rather than the patterns 150A-150E, 152A-152E having a uniform spacing regardless of the distance from the rail wheel 102, the patterns "fan out" from the pattern generators 116A-116C at a constant inter-line angle. As a result, the computer system 20 can analyze a combination of the location and spacing of the patterns 150A-150E, 152A-152E in the image data 134A, 134B to derive a distance between the rail wheel 102 and the imaging devices 114A, 114B. Use of divergent patterns of structured light, provides the computer system 20 and/or imaging devices 114A, 114B (e.g., including a device, such as a video processor board like those of the Overa line manufactured by Gumstix) with data capable of being quickly assessed to determine when to acquire image data while acquiring images at video rates.

In an embodiment, the computer system 20 can process the image data 134A, 134B in near real time to provide the user 4 (FIG. 1) with meaningful feedback regarding the usability of the image data 134A, 134B to determine the desired measurement(s). To this extent, when the computer system 20 determines that the image data 134A, 134B cannot be used, the computer system 20 can prompt the user 4 to reacquire image data for the rail wheel 102, visually inspect the rail wheel 102 for significant problems (e.g., a chip or other damage to the flange of the rail wheel 102), and/or the like.

The computer system 20 also can process multiple pairs of images acquired by the imaging devices 114A, 114B to determine whether the measurement device 112 is located in a measurement region with respect to the rail wheel 102 and/or provide feedback to the user 4 as to changes in the location of the measurement device 112 required to locate the measurement device 112 in the measurement region. In an embodiment, the imaging devices 114A, 114B automatically acquire a series of images, e.g., at multiple frames per second, which the computer system 20 processes to automatically determine whether the measurement device 112 is located in a measurement region, and if not, which changes to the location/orientation of the measurement device 112 are required to locate it within the measurement region.

Figure 5:
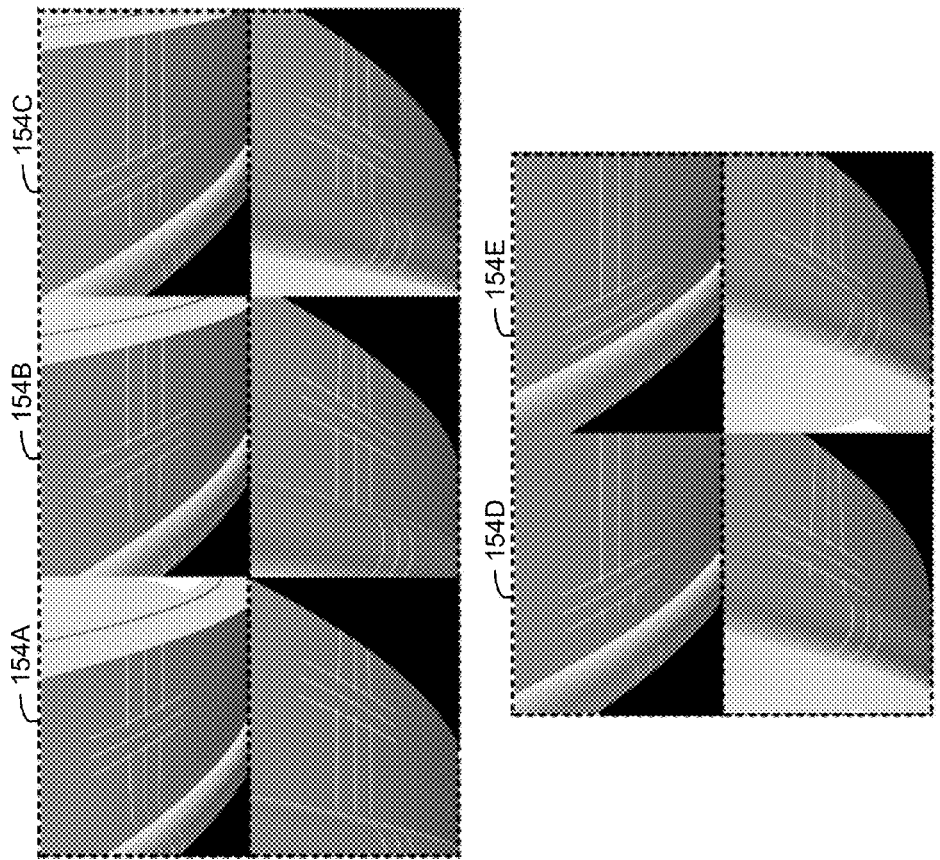
FIG. 5 shows an illustrative series of pairs of images of a rail wheel concurrently acquired by the measurement device of FIG. 2 according to an embodiment.

For example, FIG. 5 shows an illustrative series of pairs of images 154A-154E of a rail wheel 102 (FIG. 3) concurrently acquired by the measurement device 112 (FIG. 2) according to an embodiment. As illustrated, the top image of each pair of images 154A-154E corresponds to a field side image of the rail wheel 102, while the bottom image corresponds to a gauge side image of the rail wheel 102. As the user 4 (FIG. 1) moves the measurement device 112, eventually all of the patterns 150A-150E, 152A-152E shown in FIGS. 4A and 4B become visible in the pair of images 154C.

In an embodiment, the computer system 20 is configured to automatically process the pairs of images 154A-154E and determine whether each pair of images 154A-154E is suitable for determining a target set of measurements of the surface of the rail wheel 102. As a user 4 could move the measurement device 112 through the measurement region in a fraction of a second, it would be difficult for the user 4 to know exactly when the measurement device 112 is within the measurement region. For example, the computer system 20 can examine each image for the presence, location, and spacing of one or more of the patterns 150A-150E, 152A-152E within the image data. The computer system 20 can require that the pattern(s) be found within a particular region of the image data acquired by each imaging device 114A, 114B for the pair of images to be used to determine the measurement(s). If not, the computer system 20 can provide feedback to the user 4 as to the direction in which to move the measurement device 112 with respect to the rail wheel 102.

In a more particular embodiment, the computer system 20 examines each image in a pair of images for the presence of the corresponding diameter pattern 150D, 152C within a particular region of the field of view of the respective imaging device 114A, 114B. More specifically, the computer system 20 can check a column centroid of each diameter pattern 150D, 152C against a range determined to correspond to an acceptable range. When the column centroids of both diameter patterns 150D, 152C are within the corresponding ranges, the computer system 20 can classify the pair of images as good, and further process the image data to determine the measurement(s). In another embodiment, the computer system 20 can process each pair of images 154A-154E to determine whether all of the patterns 150A-150E, 152A-152E are visible to classify the pair of images as being good.

In an embodiment, the imaging devices 114A, 114B can acquire images at a significant speed, e.g., thirty frames per second or more. Furthermore, the measurement device 112 can have a measurement region corresponding to various locations corresponding to approximately one half to five-eighths of an inch (e.g., one to two centimeters) of travel. In this case, when the user 4 moves the measurement device 112 at relatively slow speeds (e.g., two inches or five centimeters) per second through the measurement region, the imaging devices 114A, 114B can acquire between seven and nine pairs of images that include all of the patterns 150A-150E, 152A-152E in the image data. In this case, the computer system 20 can independently derive measurements for one or more attributes of the surface of the rail wheel 102 from each pair of images (and/or each line in each pair of images) and combine the measurements (e.g., by averaging) to determine a final measurement of each attribute.

By utilizing multiple independent measurements of such quantities, the computer system 20 can improve an accuracy of the measurements by the square root of the number of independent measurements. In the illustration above, the uncertainty of the measurements can be reduced by as much as a factor of three. Using higher imaging speeds and/or slower passes through the critical area, the accuracy can be significantly increased. Furthermore, the profiling techniques described herein have been shown to be accurate to better than one sixty-fourth of an inch in real-world applications. A combination of multiple independent measurements with the profiling techniques described herein can be configured to provide an accuracy of better than five mils. Other refinements to the embodiments described herein could provide even greater accuracy.

For a pair of images 154A-154E to be usable for determining measurement(s) of one or more attributes of a surface of the rail wheel 102, a pose of the measurement device 112 will need to be within a range of acceptable poses. To this extent, the measurement device 112 can include a pose device 18 (FIG. 1) for acquiring pose data for the measurement device 112. An illustrative pose device 18 comprises an inertial measurement unit (IMU). By concurrently activating the imaging devices 114A, 114B to simultaneously acquire image data of a complete profile of the rail wheel 102, the computer system 20 does not require a dynamic record of an entire process of movement and pose of the measurement device 112 throughout the measurement period. Furthermore, the computer system 20 does not need to stitch the images to determine the complete profile. To this extent, in an embodiment, the pose device 18 comprises a three-axis accelerometer, which can provide instantaneous static measurements of the pose of the measurement device 112 for most degrees of freedom. To this extent, the accelerometer can provide the computer system 20 with a clear and unambiguous measurement of the pose of the measurement device 112, with the exception of a rotation of the measurement device 112 about the gravity axis.

In an embodiment, the measurement device 112 can be effectively operated with any one of multiple distinct poses. For example, when the rail wheel 102 is installed on a rail vehicle (transit or freight), presentation of the measurement device 112 to the rail wheel 102 can be severely constrained, as a large portion of the rail wheel 102 will be practically inaccessible. For typical heavy transit and freight rail applications, the accessible portions of a rail wheel 102 installed on a rail vehicle is from a top of a rail on which the rail wheel 102 is located to roughly horizontal to the rail (e.g., approximately one quarter of the wheel on either side of the rail). As a result, a proper presentation of the measurement device 112 to the rail wheel 102 will be at an approximately forty-five degree angle to the vertical. For light transit applications and when the rail wheel 102 is not installed on a rail vehicle, an area directly above a top of the rail wheel 102 may be open, which will make holding the measurement device 112 approximately flat and parallel to the rail the proper presentation to the rail wheel 102.

In an embodiment, the computer system 20 can automatically determine a proper pose angle for the measurement device 112 by examining a general orientation of the measurement device 112. For example, using the applications discussed above, when the general orientation is within an angle between, for example, thirty-five and fifty-five degrees from the vertical, the computer system 20 can use a forty-five degree angle to the vertical as the proper presentation. Similarly, when the general orientation is within an angle between, for example, +/−ten degrees of the horizontal, the computer system 20 can use the horizontal as the proper presentation.

Each pose option (e.g., horizontal or forty-five degrees) has two mirror-image possibilities, which will be utilized by the user 4 depending on a side of the rail vehicle the user 4 is standing as well as a direction the user 4 is facing. For example, the user 4 may select either side of the lower portion of a rail wheel 102 from which to acquire data for the measurement(s) and/or be moving along the side of a rail vehicle in either direction (front to back or back to front). In an embodiment, the measurement device 112 automatically determines which of the two mirror-image possibilities are appropriate for a given measurement data acquisition.

For example, each handle 142A, 142B (FIG. 2) of the measurement device 112 can include an actuator element 144A, 144B (FIG. 2), such as a trigger, either of which can be operated by the user 4 to initiate operation of the pattern generators 116A-116C and/or imaging devices 114A, 114B to acquire the measurement data. The computer system 20 can identify which actuator element 144A, 144B was utilized by the user 4, and assign the imaging device 114A, 114B located on the same side to a corresponding side of the rail wheel 102. The corresponding side can vary based on an application. in which the measurement device 112 is being utilized. For example, in a field application (e.g., a rail yard), the computer system 20 can designate the side on which the user 4 is located as the field side of the rail wheel 102. In contrast, for a pit setting application, the user 4 is located on the gauge side of the rail wheel 102. The computer system 20 can include any mechanism for selecting an application, such as a switch, a menu selection in a control menu, and/or the like.

As discussed herein, when the pose device 18 (FIG. 1) is a three-axis accelerometer, the computer system 20 does not receive clear information regarding a rotation of the measurement device 112 about the vertical (gravity) axis as the acceleration due to gravity, which is the reference for such accelerometers, will not apparently vary in any of the three accelerometers with such a rotation. For a forty-five degree presentation described herein, this rotation can be referred to as yaw. For a horizontal presentation described herein, the rotation corresponds to a spin or roll of the measurement device 112 about its center.

In an embodiment, the computer system 20 measures the rotation of the measurement device 112 about the vertical axis using one or more of the patterns present in the image data captured by the measurement device 112. In a more particular embodiment, the computer system 20 evaluates the diameter patterns 150D, 152C to measure the yaw for the forty-five degree nominal presentation angle.

To this extent, FIGS. 6A-6C show illustrative pairs of diameter patterns 160A-160C, e.g., as they may have been imaged by a pair of imaging devices, such as the imaging devices 114A, 114B (FIG. 2), according to an embodiment. In FIG. 6A, the pair of diameter patterns 160A are illustrated as they may appear with a nominal (no yaw) presentation to a flat surface. In FIG. 6B, the pair of diameter patterns 160B illustrate the measurement device 112 being rotated in a clockwise direction about the vertical axis, while FIG. 6C shows a pair of diameter patterns 160C when the measurement device 112 has been rotated in a counterclockwise direction about the vertical axis. While presentation to a curved surface, such as a rail wheel 102 (FIG. 3), changes some details of the processing described herein, the same principles will apply as would be readily recognized by one of ordinary skill in the art.

Regardless, the computer system 20 can identify the central line 162A, 162B in each diameter pattern 164A, 164B, respectively. At one or more locations along the length of the central line 162A, 162B, the computer system 20 can measure a distance 166A, 166B between the outer lines of each diameter pattern 164A, 164B at a right angle to the central line 162A, 162B. For the pair of diameter patterns 160A, the distances 166A, 166B are substantially equal. For the pair of diameter patterns 160B, the rotation results in the left imaging device moving closer to the surface, the right imaging device moving farther from the surface, and the pattern generator inclining to the surface. As a result, the distance 166A is narrower than the distance 166B. Similarly, for the pair of diameter patterns 160C, the rotation results in the left imaging device moving farther from the surface, the right imaging device moving closer to the surface, and the pattern generator inclining to the surface. As a result, the distance 166A is wider than the distance 166B. Additionally, the distances 166A, 166B for the diameter patterns 160B, 160C also are narrower or wider with respect to the distances 166A, 166B for the pair of diameter patterns 160A.

The computer system 20 can calculate a ratio between the two distances 166A, 166B to serve as a parameter to measure yaw. In particular, for a ratio of approximately one, the measurement device 112 is in an approximately nominal position with respect to yaw. If the ratio is less than one, there is some amount of yaw in a clockwise direction around the vertical axis, and if the ratio is greater than one, there is some amount of yaw in a counterclockwise direction about the vertical axis. The computer system 20 can calculate an exact measurement of the yaw angle using the exact ratio of the differences between the distances 166A, 166B using any solution. It is understood that the computer system 20 can implement a similar process for using the two distances 166A, 166B to measure roll in the horizontal presentation application using any solution.

The computer system 20 also can calculate a standoff distance for the measurement device 112 using the distances 166A, 166B. For example, an average of the distances 166A, 166B will relate directly to the standoff distance from the target surface (e.g., the rail wheel 102) since the lines are divergent. In particular, when the standoff distance is smaller, the average of the distances 166A, 166B is smaller, and when the standoff distance is larger, the average of the distances 166A, 166B is larger. By knowing the distance between the lines at a given distance and a rate at which the diameter pattern is diverging, the computer system 20 can calculate the standoff distance for the measurement device 112 using any solution.

Once one or more acceptable pairs of images has been captured for an object, such as the rail wheel 102, the computer system 20 can further process the images. To properly register the three-dimensional data into a two-dimensional measurement space, the computer system 20 must properly compensate for all of the pose aspects or the calculated measurements will be incorrect in a proportion based on the uncompensated angle(s). In addition to determining the yaw angle as described herein, the computer system 20 can determine the other angles of pose directly from data provided by the pose device 18 (FIG. 1), such as a three-dimensional accelerometer, which can measure the remaining angles of pose with a high degree of accuracy. The computer system 20 can implement any solution for compensating for the angles when registering the three-dimensional data into the two-dimensional measurement space. In an illustrative embodiment, the computer system 20 implements a solution described in U.S. Pat. No. 6,758,551, which is hereby incorporated by reference. With all pose angles compensated for, the images now exist in a registered two-dimensional plane and the computer system 20 can compute the actual measurement(s) of one or more attributes of the surface of the object, such as the rail wheel 102, using any solution, such as those described in U.S. Pat. Nos. 5,636,026 and 6,768,551.

Returning to FIG. 1, as described herein, proper presentation of the measurement device 12 to a surface of an object 2 is an important aspect of obtaining quality measurements using a measurement device 12 described herein. Such proper presentation can be performed through the use of any of various mechanical structures, which can support and/or move the measurement device 12 in a proper position for presentation to the object 2. In an embodiment, the measurement device 12 is configured to be held and positioned by a human user 4 when acquiring the measurement data 34. To this extent, the measurement device 12 can include an interface, which provides feedback to assist the user 4 in properly positioning the measurement device 12 with respect to the surface of the object 2.

Figure 7:
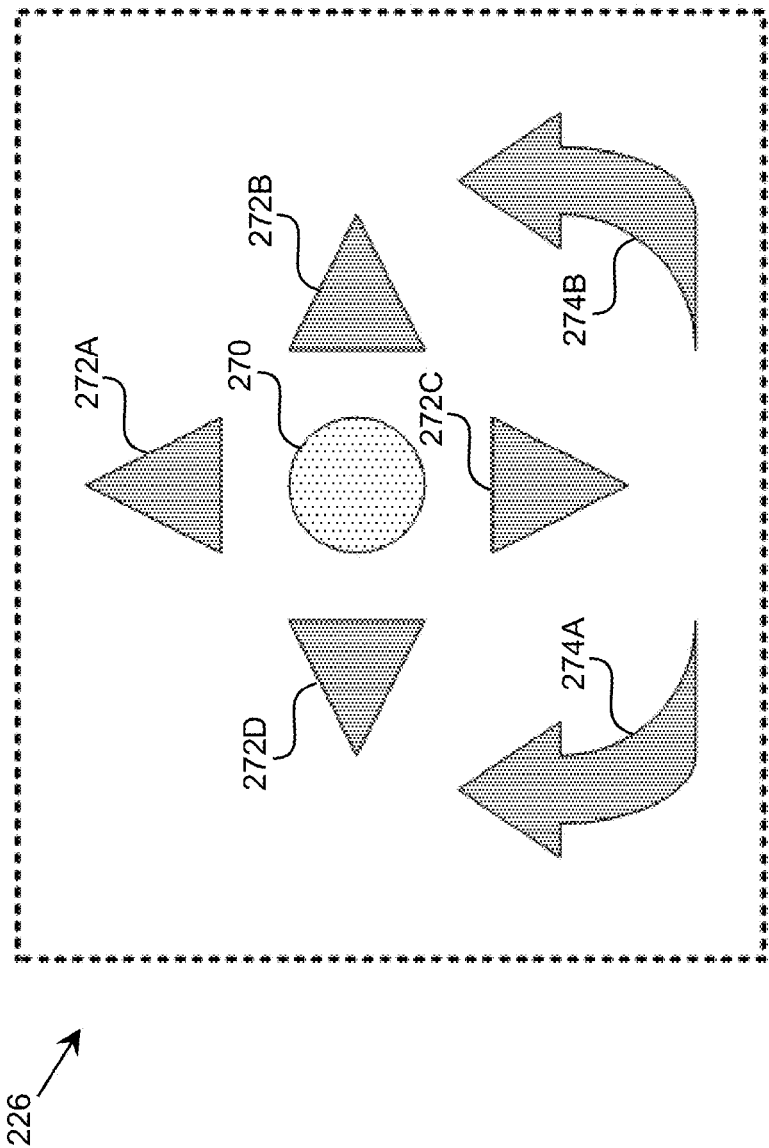
FIG. 7 shows an illustrative positioning interface according to an embodiment.

FIG. 7 shows an illustrative positioning interface 226 according to an embodiment. The positioning interface 226 can be presented to the user 4 (FIG. 1) using any solution. For example, the positioning interface 226 could be presented on a portion of a display interface, such as the interface 126 shown in FIG. 2, or could be implemented as a series of distinct illuminated (e.g., LED) indicators. Furthermore, while shown graphically, it is understood that a positioning interface 226 could provide comparable auditory indications to the user 4 instead of or in addition to the graphical indicators shown herein.

Regardless, the positioning interface 226 can include a good pose indicator 270, tilt indicators 272A-272D, and rotation indicators 274A, 274B. The positioning interface 226 can include one or more features to assist the user 4 in readily identifying the change in positioning required. For example, the various indicators 270, 272A-272D, 274A, 274B can have different shapes, different colors, and/or the like. During operation, the computer system 20 can analyze image data acquired by the imaging device(s) 14 and make a determination as to any corrections to the position of the measurement device 12, if necessary, required by the user 4. In response, the computer system 20 can illuminate the corresponding indicator(s).

In an embodiment, the computer system 20 can keep the good pose indicator 270 lit unless one or more parameters of pose exceeds an acceptable limit. The acceptable limit can vary depending on the application and can be derived for a specific embodiment of the measurement device 12 using any solution. In an illustrative embodiment, the acceptable limits are approximately +/−five degrees of tolerance, which is well within the capability of control for a human user 4. When one or more of the pose parameters is exceeded, the good pose indicator 270 can be turned off and the corresponding correction indicator(s) 272A-272D, 274A, 274B can be lit. The lit correction indicator(s) 272A-272D, 274A, 274B can correspond to the direction that the user 4 must turn or tilt the measurement device 12 or correspond to the direction of the error. As some users 4 may prefer one indication over the other, the computer system 20 can provide an ability for the user 4 to select the correction indicator configuration that he/she finds most intuitive.

As a number of image pairs used to determine a measurement can be affected by a speed at which the measurement device 12 is presented to the surface of the object 2, the measurement device 12 also can include a feedback mechanism for informing the operator that the measurement device 12 is being moved too quickly. For example, the computer system 20 can estimate a speed with which the measurement device 12 is being moved using changes in the image data acquired in multiple image pairs. For example, the computer system 20 can determine the speed by analyzing changes in a set of lines (e.g., location of the lines, separation of the lines, etc.) visible in the image data acquired at a known difference in time. Feedback can be provided using any solution, such as an auditory signal, a vibration signal, and/or the like. An amplitude of the signal can be varied depending on an amount with which the user 4 should slow down the movement of the measurement device 12. Similarly, the measurement device 12 can generate a signal when the computer system 20 determines that sufficient data has been acquired to calculate an accurate measurement for each of the attribute(s). In an embodiment, the computer system 20 can first determine whether sufficient data has been acquired prior to signaling the user 4 and/or requesting that the user 4 repeat a reading.

While operation of the measurement device 112 of FIG. 2 has been described primarily in conjunction with measuring various attributes of a rail wheel 102 (FIG. 3), it is understood that embodiments of a measurement device described herein can be utilized to measure attribute(s) of various other non-rail and rail objects. For example, an embodiment of the measurement device 112 can be configured to measure one or more features of a rail on which the rail wheel 102 travels. Such rails undergo similar wear as the rail wheel 102. The measurement device 112 can enable the user 4 to select one of multiple target objects for measuring (e.g., a rail wheel, a rail, and/or the like), and the computer system 20 can operate the imaging devices 114A, 114B and the pattern generators 116A-116C and adjust the image processing described herein accordingly. In an alternative embodiment, the solution described herein can be implemented in a measurement device having a hardware configuration specifically designed for measuring attributes of a rail.

It is understood that aspects of the invention described herein can be directed to measurement devices for use in measuring surface attributes of objects utilized in various types of industries and applications. When utilized properly, an embodiment of a measurement device described herein can calculate highly accurate measurements, which may be required or desired for some applications. To this extent, in a number of settings, especially aerospace, large expanses of a vehicle or other object are covered with some material that is held down by a large number of fasteners. A flushness of these fasteners (evenness of the top of the fastener with the surface) can be of considerable importance for both safety and operational concerns as well as pure aesthetics. For example, a protruding nail or screw head may catch on clothing or flesh that passes over it, and in the case of high-speed aircraft, even very small variations in flushness can have considerable effect on the aerodynamics and safety of the aircraft.

FIGS. 8A and 8B show side and top views, respectively, of an illustrative measurement device 312 for measuring attributes of a substantially uniform surface according to an embodiment. For example, the measurement device 312 can be utilized to measure a flushness of a plurality of fasteners 306 located on a surface of an object 302 (e.g., an aircraft). The measurement device 312 includes a housing 340, which contains the various components (e.g., as shown and described in conjunction with FIG. 1) for operating the measurement device 312. To this extent, an imaging device 314 and a pattern generator 316 are shown located on a bottom surface of the housing 340, which can be operated by a computer system 20 (FIG. 1) located within the housing 340 to acquire measurement data 34 (FIG. 1) for the surface of the object 302.

As illustrated in FIG. 8A, the pattern generator 316 can generate a divergent pattern of structured light (e.g., a fan of lines) into the field of view of the imaging device 314. An angle between the imaging device 314 and the pattern generator 316 can be precisely characterized to allow the computer system 20 to measure a distance to any point of the pattern of structured light that intersects the object 302 within the field of view of the imaging device 314 using any solution. Depending on an application, ambient light may interfere with an ability of the computer system 20 to identify the pattern of structured light within image data acquired by the imaging device 314. To this extent, in an embodiment, the housing 340 can include a skirt 346 attached thereto, which can be configured to exclude some or all of the ambient light from the region of the object 302 being imaged. While shown as having some transparency to depict certain components of the measurement device 312, it is understood that the skirt 346 can be opaque. The skirt 346 can be formed of any type of resilient, soft material, which would be unlikely to damage or otherwise soil the surface of the object 302 with which the skirt 346 may come in contact.

In any event, during use, the measurement device 312 is passed over the surface of the object 302 in an area where a number of fasteners 306 are present. As each fastener 306 passes into the field of view of the imaging device 314, it is also intersected by the pattern of structured light generated by the pattern generator 316. The pattern of structured light provides a measurement profile across the field of view of the imaging device 314, which can be extracted and measured using any solution. An embodiment of the measurement device 312 can measure the profile of the surface of the object 302, and any variations due to the fasteners 306 included thereon, to an accuracy of small fractions of a mil, especially when the computer system 20 can automatically reference such measurements to the surface of the object 302 immediately around the fastener 306.

An embodiment of the measurement device 312 can be configured for handheld operation by a human user 4 (FIG. 1). To this extent, the housing 340 is shown including a strap 348 attached thereto, which can be configured to secure the measurement device 312 on the hand of the user 4. Furthermore, as shown in FIG. 8B, the housing 340 and/or strap 348 can include various interface components, which can assist the user 4 in operating the measurement device 312. For example, the housing 340 can be configured similar to a computer mouse. In this case, the housing 340 can include a left button 326A, a right button 326B, and a scroll wheel 326C. Additionally, the strap 348 can include feedback components, such as a display screen 326D (e.g., a high contrast LCD or any similar device to allow the user 4 to view the display in sunlight), a set of indicator lights 326E, and/or the like.

In an illustrative configuration of the interface components 326A-326E, the user 4 can use the right button 326B to toggle between modes of display for the display screen 326D (e.g., image, measurement, setup, calibration, and/or the like). The scroll wheel 326C can enable the user 4 to scroll through particular selections or options on the display screen 326D, while the left button 326A can enable the user 4 to choose a particular selection or option. The set of indicator lights 326E and/or display screen 326D can provide the user 4 with other information, such as a charging status, proper operation of the measurement device 312, feedback for pose during operation of the measurement device 312, and/or the like. To this extent, the display screen 326D is shown including an indicator interface similar to that shown and described in conjunction with FIG. 7. For measuring flushness of the surface of an object 302, a rotation of the device about the axis normal to the plane of the object 302 is not relevant to operation of the measurement device 312, and therefore, no indicators are required for those rotations in such an application. It should be noted that the interface shown and described herein is merely a conceptual diagram and many other control interfaces can be utilized in embodiments of the invention.

Returning to FIG. 1, the measurement device 12 can comprise a component of a larger system being utilized to evaluate various aspects of an object 2 and/or a group of objects. To this extent, the measurement device 12 can be configured to communicate with a central system 36, which is managing an overall evaluation and/or processing of the object(s) 2. Such communications can include: the central system 36 providing instructions to the measurement device 12, which can be presented to the user 4; the measurement device 12 providing a result of an evaluation of the object 2 for processing by the central system 36; and/or the like. Such evaluations can be performed as any part of a lifecycle of use of the object 2 (and/or a machine of which the object 2 is one component), including: a final evaluation before deploying the object 2; a regular or unannounced inspection of the object 2; maintenance of the object 2; repair of the object 2; and/or the like.

While shown and described herein as a method and system for measuring attribute(s) of a surface of an object, it is understood that aspects of the invention further provide various alternative embodiments. For example, in one embodiment, the invention provides a computer program fixed in at least one computer-readable medium, which when executed, enables a computer system to measure attribute(s) of a surface of an object. To this extent, the computer-readable medium includes program code, such as the measurement program 30 (FIG. 1), which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In an illustrative process, the measurement program 30 can enable the computer system 20 to receive an activation of the measurement device 12 by the user 4 and, in response, commence evaluating a pose of the measurement device 12 as described herein. The measurement program 30 can enable the computer system 20 to trigger the imaging device(s) 14 and pattern generator(s) 16 to begin acquiring measurement data 34 and process the initial measurement data 34, e.g., to determine one or more use parameters, such as presentation angle and side. The user 4 can move the measurement device 12 such that it passes within a measurement region for the object 2, with which measurement program 30 can enable the computer system 20 to provide feedback to assist the user 4. Furthermore, the measurement program 30 can enable the computer system 20 to process the image data to generate additional measurement data 34 to: recognize and retain only useable image data (e.g., pairs of images); analyze the image data to produce multiple measurements of an attribute of the surface of the object 2; average the measurements to arrive at a refined measurement of the attribute of the object 2; store the measurement data 34; present or transmit the measurement data 34 and/or a result of an evaluation to the user 4 and/or the central system 36; and/or the like.

In another embodiment, the invention provides a method of providing a copy of program code, such as the measurement program 30 (FIG. 1), which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for measuring attribute(s) of a surface of an object. In this case, the generating can include configuring a computer system, such as the computer system 20 (FIG. 1), to implement the method of measuring attribute(s) of a surface of an object. The configuring can include obtaining (e.g., creating, maintaining, purchasing, modifying, using, making available, etc.) one or more hardware components, with or without one or more software modules, and setting up the components and/or modules to implement a process described herein. To this extent, the configuring can include deploying one or more components to the computer system, which can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system comprising:
  a handheld measurement device including:
    a first imaging device configured to acquire image data of a surface of an object located in a measurement region relative to the handheld measurement device;
    a second imaging device configured to acquire image data of the surface of the object located in the measurement region relative to the handheld measurement device, wherein the image data acquired by the first imaging device has a field of view at least partially overlapping the image data acquired by the second imaging device when the surface of the object is located in the measurement region relative to the handheld measurement device;
    a projected pattern generator configured to generate a divergent pattern of structured light, wherein the divergent pattern of structured light impacts the surface of the object within a field of view of the first imaging device when the object is located in the measurement region; and
    a computer system configured to measure a set of attributes of the surface of the object by performing a measurement method including:

concurrently activating the first and second imaging devices to acquire image data;

processing the image data acquired by the first and second imaging devices in response to the activating, wherein the processing includes determining whether the measurement device was located within a range of measurement locations when the image data was acquired, wherein the range of measurement locations includes a range of distances from the object and a range of orientations with respect to the object, for which the handheld measuring device is configured; and determining a measurement of at least one attribute of the surface of the object using the image data in response to the processing determining the measurement device was located within the range of measurement locations when the image data was acquired.

2. The system of claim 1, the handheld measurement device further including an interface component, wherein the measurement method further includes providing information regarding the surface of the object to a user of the handheld measurement device using the interface component.

3. The system of claim 1, the handheld measurement device further including a three-axis accelerometer, wherein the processing the image data is further based on data received from the three-axis accelerometer.

4. The system of claim 1, wherein the processing includes determining a relative pose of the measurement device with respect to the surface of the object.

5. The system of claim 1, wherein the measurement method further includes calculating a rotation of the handheld measurement device with respect to a gravity vector using the image data concurrently acquired by the first and second imaging devices.

6. The system of claim 1, wherein the object comprises a railroad wheel.

7. The system of 1, wherein the divergent pattern of structured light includes:
a first plurality of lines; and
a second plurality of lines substantially perpendicular to the first plurality of lines.

8. A system comprising:
a handheld railroad wheel measurement device including:
first and second imaging devices configured to acquire image data of a portion of a railroad wheel located in a measurement region relative to the handheld railroad wheel measurement device, wherein the image data acquired by the first imaging device has a field of view at least partially overlapping the image data acquired by the second imaging device when the railroad wheel is located in the measurement region;
a projected pattern generator configured to generate a divergent pattern of structured light, wherein the divergent pattern of structured light impacts a surface of the railroad wheel within the fields of view of the first and second imaging devices when the railroad wheel is located in the measurement region; and
a computer system configured to concurrently activate the first and second imaging devices and process the image data acquired by the first and second imaging devices, wherein the processing includes evaluating a set of attributes of the divergent pattern of structured light in the image data to determine whether the measurement device was located within the measurement region when the image data was acquired.

9. The system of claim 8, wherein the measurement device further includes a three-axis accelerometer, wherein the computer system is further configured to process pose data acquired by the three-axis accelerometer to determine a pose of the measurement device.

10. The system of claim 9, wherein the computer system processes the pose data by performing a method including:
determining a current orientation of the measurement device using the pose data; and
automatically determining a proper pose angle based on the current orientation of the measurement device.

11. The system of claim 8, wherein the measurement device includes a pair of handles located on opposing sides of the measurement device, and wherein each handle includes a trigger mechanism, wherein the computer system automatically assigns a side of the railroad wheel for each of the imaging devices based on the trigger mechanism used by a user.

12. The system of claim 8, wherein the image data acquired by the first and second imaging devices includes a plurality of pairs of images concurrently acquired by each of the first and second imaging devices, and wherein the processing includes determining a measurement of at least one feature of a surface of the railroad wheel using the plurality of pairs of images.

13. The system of claim 8, further comprising a central computer system for managing an inspection of a plurality of railroad wheels by a user using the handheld railroad wheel measurement device, wherein the managing includes:
receiving measurement data from the computer system for a railroad wheel in the plurality of railroad wheels; and
evaluating an operability of the railroad wheel based on the received measurement data and data corresponding to a previous measurement of the railroad wheel.

14. The system of claim 8, wherein the handheld railroad wheel measurement device further includes an interface component, wherein the measurement method further includes providing information regarding a pose of the handheld railroad wheel measurement device with respect to a surface of the railroad wheel to a user of the handheld measurement device.

15. A system comprising:
a measurement device including:
a first imaging device configured to acquire image data of a surface of an object located in a measurement region relative to the handheld measurement device;
a projected pattern generator configured to generate a divergent pattern of structured light, wherein the divergent pattern of structured light impacts the surface of the object within a field of view of the imaging device when the object is located in the measurement region;
an accelerometer; and
a computer system configured to acquire data for measuring a set of attributes of the surface of the object by performing an acquisition method including:
activating the first imaging device and the projected pattern generator;
determining a pose of the measurement device using image data acquired by the first imaging device and data received from the accelerometer; and
evaluating at least one of: the image data and the pose to determine whether the measurement device is within a measurement region.

16. The system of claim 15, wherein the acquisition method further includes storing image data for measuring the set of attributes in response to evaluating the measurement device as being within the measurement region.

17. The system of claim 15, the measurement device further including a second imaging device configured to acquire image data of the surface of the object located in the measurement region relative to the measurement device, wherein the image data acquired by the first imaging device has a field of view at least partially overlapping the image data acquired by the second imaging device when the surface of the object is located in the measurement region relative to the measurement device, and wherein the acquisition method further includes concurrently activating the second imaging device with the first imaging device, wherein the determining further uses the image data acquired by the second imaging device.

18. The system of claim 15, wherein the measurement device is configured to be held by a user during operation, the measurement device further including an interface component, wherein the acquisition method further includes providing information regarding a location of the measurement device with respect to the measurement region to a user of the measurement device using the interface component.

19. The system of claim 15, further comprising:
   means for processing image data acquired when the measurement device was within the measurement region; and
   means for determining a measurement of at least one attribute of the surface of the object based on the processing.

20. The system of claim 19, wherein the means for processing and means for determining comprise the computer system located on the measurement device.

\* \* \* \* \*